US007735942B2

(12) United States Patent
Cheng et al.

(10) Patent No.: US 7,735,942 B2
(45) Date of Patent: Jun. 15, 2010

(54) FOLDABLE HOST UNIT CASE OF A COMPUTER WITH SLIDING RAIL GROOVES

(75) Inventors: Sheng-Hsiung Cheng, Taipei Hsien (TW); Te-An Lin, Taipei Hsien (TW); Wu-Nan Wang, Taipei Hsien (TW); Chia-Chia Huang, Taipei Hsien (TW)

(73) Assignee: Aopen Inc., Hsichih, Taipei Hsien (TW)

( * ) Notice: Subject to any disclaimer, the term of this patent is extended or adjusted under 35 U.S.C. 154(b) by 559 days.

(21) Appl. No.: 11/655,282

(22) Filed: Jan. 19, 2007

(65) Prior Publication Data

US 2007/0252495 A1    Nov. 1, 2007

(30) Foreign Application Priority Data

Apr. 26, 2006    (TW) ............... 95114985 A

(51) Int. Cl.
*A47B 43/00*    (2006.01)
*H05K 5/02*    (2006.01)

(52) U.S. Cl. .................. 312/258; 312/223.2

(58) Field of Classification Search .............. 312/223.1, 312/223.2, 257.1, 258, 262, 265.1; 174/68.1, 174/97, 101, 72 A, 50, 58, 66, 67; 361/679.02, 361/679.6; 211/26, 38, 195; 439/719; 16/389, 16/365, 366, 370, 362; 135/128, 130, 143, 135/144, 147, 148, 149, 151, 155, 901, 902, 135/900
See application file for complete search history.

(56) References Cited

U.S. PATENT DOCUMENTS

| 2,782,955 | A | * | 2/1957 | Gordon ........................ 220/6 |
| 3,527,340 | A | * | 9/1970 | Cipolla ...................... 206/278 |
| 3,799,384 | A | * | 3/1974 | Hurkamp .................... 220/6 |
| 4,851,812 | A | * | 7/1989 | Holmberg ................ 340/407.2 |
| 5,133,378 | A | * | 7/1992 | Tanasychuk ................ 135/148 |
| 5,212,628 | A | * | 5/1993 | Bradbury ............... 361/679.44 |
| 5,251,772 | A | * | 10/1993 | Toguchi ......................... 220/6 |
| 5,308,157 | A | * | 5/1994 | Dyer .......................... 312/258 |
| 5,447,367 | A | * | 9/1995 | Wei .......................... 312/223.2 |
| 5,527,104 | A | * | 6/1996 | Moss ......................... 312/264 |
| 5,590,022 | A | * | 12/1996 | Harvey ................. 361/679.41 |
| 5,622,198 | A | * | 4/1997 | Elsinger ..................... 135/128 |
| 5,664,854 | A | * | 9/1997 | Letch ......................... 312/262 |
| 5,673,985 | A | * | 10/1997 | Mitchell .................. 312/265.3 |
| 6,354,681 | B1 | * | 3/2002 | Nemec ..................... 312/223.2 |
| 6,473,295 | B2 | * | 10/2002 | Chen ..................... 361/679.02 |
| 6,761,421 | B2 | * | 7/2004 | Chen et al. .............. 312/223.2 |
| 6,826,039 | B2 | * | 11/2004 | Chen ....................... 361/679.3 |

(Continued)

*Primary Examiner*—Darnell Jayne
*Assistant Examiner*—Michael Calabrese

(57) ABSTRACT

A foldable host unit case of a computer with sliding rail grooves includes a front wall, which provides a first lateral end to pivotally connect with the first frame with a pivotal shaft and a second lateral end to be pivotally joined to the sliding rail groove of the second frame with a sliding block, and a rear wall, which provides a first lateral end being pivotally joined to the sliding rail groove of the second frame with a sliding block and a second lateral end pivotally connecting with the second frame with a pivotal shaft. Hence, the first frame, the second frame, the front wall and the rear wall are capable of being unfolded to set up the host unit case completely and folded to form the packaged size quickly.

6 Claims, 4 Drawing Sheets

U.S. PATENT DOCUMENTS

| | | | |
|---|---|---|---|
| 7,083,061 B2* | 8/2006 | Spindel et al. | 220/6 |
| 7,151,672 B2* | 12/2006 | Campbell | 361/725 |
| 7,213,895 B2* | 5/2007 | Wu | 312/258 |
| 2002/0109441 A1* | 8/2002 | Wang | 312/258 |
| 2005/0063147 A1* | 3/2005 | Yu | 361/683 |
| 2005/0174019 A1* | 8/2005 | Chi-Sheng | 312/258 |

* cited by examiner

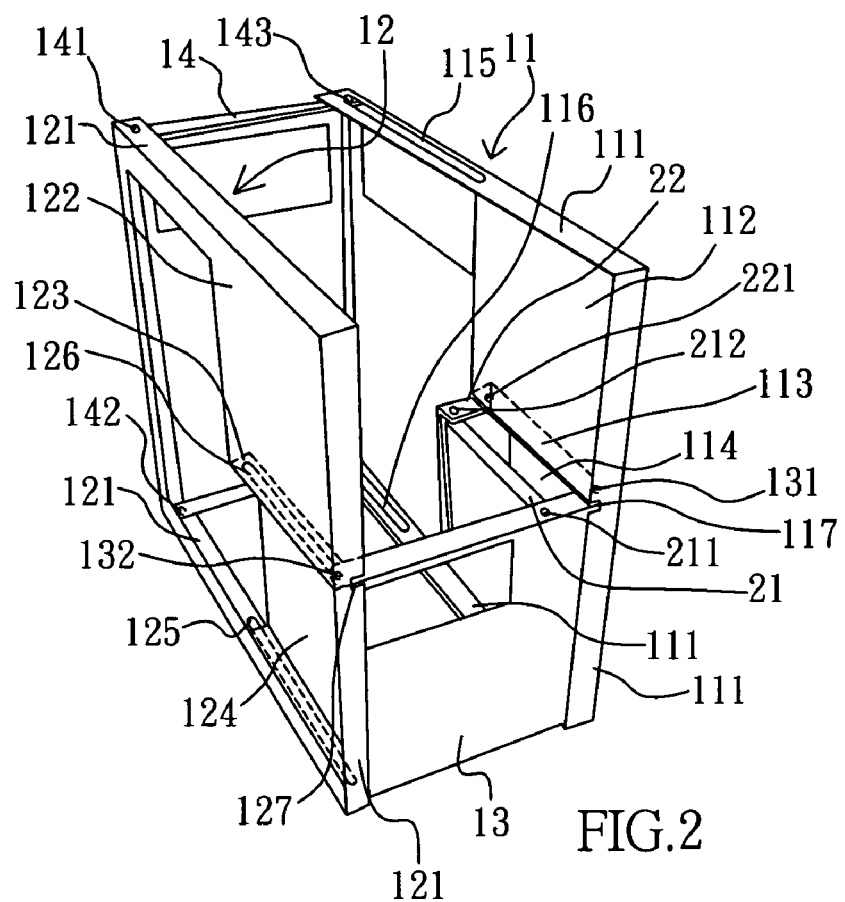
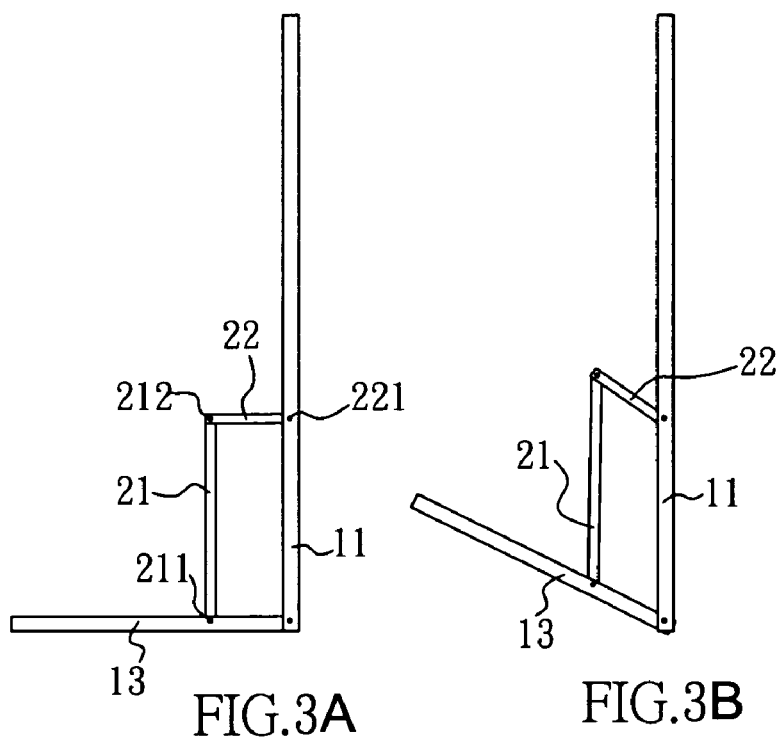
FIG. 2
FIG. 3A   FIG. 3B

FOLDABLE HOST UNIT CASE OF A COMPUTER WITH SLIDING RAIL GROOVES

BACKGROUND OF THE INVENTION

1. Field of the Invention

The present invention is related to a host unit case of a personal computer and particularly to a built-up type host unit case of a computer.

2. Brief Description of Related Art

The host unit case is employed to receive electronic devices such as a main board, hard disks, optical disk drives, floppy disk drives and power supply device. Usually, the host unit case is set up with an unchangeable structure. The prior art related to the composite type host unit case has been published in such as U.S. Pat. No. 6,961,236 and Taiwan Utility model publication No. M258544. U.S. Pat. No. 6,961,236 discloses a computer chassis and Taiwan Utility model publication No. M258544 discloses a host unit case to meet specifications of ATX and BTX.

The prior art related to an assembled type host unit case is made into several assembled parts for being set up as the host unit case. Taiwan Patent Publication No. 468811 discloses a host unit case for an industrial computer. Taiwan Patent Publication No. 474423 discloses a computer chassis free from aid of hand tools. Taiwan Patent Publication No. 490120 discloses a composite type computer chassis. Taiwan Patent Publication No. 531142 discloses a composite type computer chassis assembly.

Further, the computer chassis free from aid of hand tools disclosed in Taiwan Patent Publication No. 474423 provides the front and rear cover plates, which are pivotally joined to a bottom plate with head pins, two frame plates for a big floppy disk drive, which are pivotally joined to the front and rear cover plates, and a cover plate for a small floppy disk drive is assembled to a frame plate and is fixedly hung to the bottom of frame plate for the big floppy disk drive. Further, four L shaped plates are fixed at four corners of the bottom plate to be joined to the two cover plates firmly. Finally, two lateral cover plates are hooked to the lateral sides of the preceding structure and fastened with set screws after the main board and the power supply frame being mounted to the preceding structure to complete the whole assembly of the computer chassis. The parts of the computer chassis are packaged separately such that less space is required for storage.

However, the parts of the preceding prior art are divided into several part groups and the parts are not plate-shaped completely. Further, new parts have to be added for setting up the host unit case so that the whole package of the parts occupies a large space.

SUMMARY OF THE INVENTION

The crux of the present invention is to develop a host unit case, which is capable of reducing the volume thereof after being packaged for lowering delivery cost and decreasing storage space.

The primary object is to provide a foldable host unit case of a computer with which all components can be gathered as a package with small volume for lowering delivery cost and decreasing storage space.

Accordingly, the foldable host unit case of a computer with sliding rail grooves, which is capable of being folded and reduced volume thereof while packaging and being set up conveniently and quickly, includes:

a first frame, providing sliding rail grooves at the rear end thereof;

a second frame, providing another rail grooves at the front end thereof;

a front wall, providing a first lateral end to pivotally connect with the first frame by means of pivotal shafts and a second lateral end being movably joined to the sliding rail groove of the second frame by means of sliding blocks; and a rear wall, providing a first lateral end and a second lateral end, the second lateral end pivotally connect with the second frame by means of pivotal shafts and the first lateral end being movably joined to the sliding rail groove of the first frame by means of sliding blocks;

whereby, the first frame, the second frame, the front wall and the rear wall are capable of being unfolded to set up the host unit case completely such that host unit case is capable of being folded and reduced volume thereof while packaging and being set up conveniently and quickly

BRIEF DESCRIPTION OF THE DRAWINGS

The present invention can be more fully understood by reference to the following description and accompanying drawings, in which:

FIG. 2 is a perspective view of main structure in the preferred embodiment of the present invention;

FIG. 3A is an elevational view illustrating the first step for folding first support element, the first frame and front wall in the preferred embodiment of the present invention;

FIG. 3B is an elevational view illustrating the second step for folding first support element, the first frame and front wall in the preferred embodiment of the present invention;

DETAILED DESCRIPTION OF THE INVENTION

Figure 1:
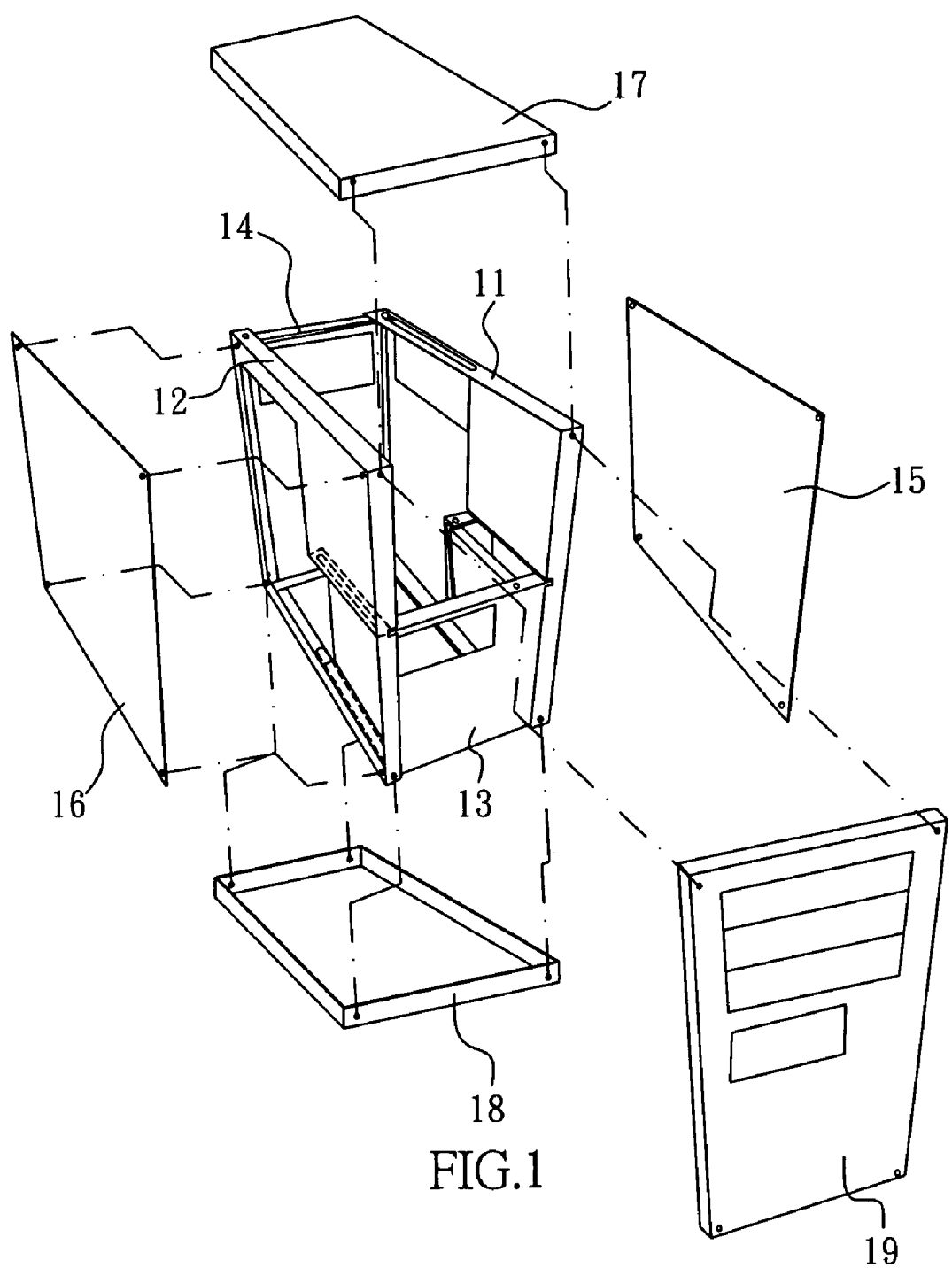
FIG. 1 is an exploded perspective view of a preferred embodiment of foldable host unit case of a computer with sliding rail grooves according to the present invention.

Referring to FIG. 1, a foldable host unit case of a computer with sliding rail grooves according to the present invention, which is capable of being reduced packaged volume thereof and being set up conveniently and quickly, is illustrated. The host unit case 10 of the present invention includes a first frame 11 and a second frame 12, which have the front and rear ends thereof pivotally joining with the front wall 13 and the rear wall 14; a left side plate 15 and a right side plate 16, which are joined to left and right sides of the first frame 11 and the second frame 12; an upper cover 17 and a lower cover 18, which are joined to the upper and lower ends of the first frame 11 and the second frame 12 respectively; a front panel 19, which is joined to the front ends of the first frame 11 and the second frame 12. The previous components engage with each other by means of screws passing through corresponding holes provided at the components or by means of holes and projections, which are provided at the components and correspond to each other, engaging with each other.

Referring to FIG. 2, the main structure of the host unit case in the preferred embodiment of the present invention is the first frame 11 and the second frame 12 have a frame edge 111, 121 bending inward respectively and have an upper vertical plate 112, 122, a horizontal connecting plate 113, 123 and a lower vertical plate 114, 124 at the front ends thereof respectively. The lower end of the upper vertical plate 112 of the first frame 11 is connected to the inner side of the horizontal connecting plate 113 and the upper end of the lower vertical plate 114 is connected to the outer side of the horizontal connecting plate 113 such that the upper vertical plate 112 is closer to the second frame 12 than the lower vertical plate 114. The lower end of the upper vertical plate 122 of the second frame 12 is connected to the outer side of the horizontal connecting plate 123 and the upper end of the lower vertical plate 124 is connected to the inner side of the horizontal connecting plate 123 such that the lower vertical plate 124 is closer to the first frame 11 than the upper vertical plate 122. The upper and lower ends of the first lateral side at the front wall 13 pivotally connect with the horizontal connecting plate 113 of the first frame 11 and the frame edge 111 at the lower end of the first frame 11 by means of pivotal shafts 131. The frame edge 121 at the lower end of the second frame 12 and the horizontal connecting plate 123 provides a groove rail 125, 126 respectively at the lower end of the second frame 12 such that the upper and lower ends of the second lateral side of the front wall 13 are movably joined to the lower end of the second frame 12 and the sliding groove rail 125, 126 respectively by means of a sliding block 132.

The upper and lower ends of the second side of the rear wall 14 are pivotally joined to the frame edge 121 at the rear end of the second frame 12 by means of pivotal shafts 141, 142. The frame edges 111 at the upper and lower sides of the first frame 11 provide a sliding rail groove 115, 116 respectively. The upper and lower ends of the first side of the rear wall 14 are movably attached to the sliding rail groove 115, 116 respectively by means of a sliding block 143. The frame edges 111, 121 at the front ends of the first frame 11 and the second frame 12 have a recess 117, 127 to expose the frame edge at the upper end of the front wall 13.

Figures 3C, 3D:
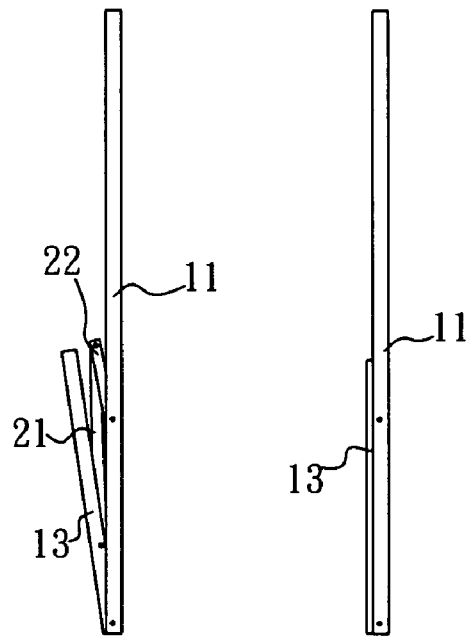
FIG. 3C is an elevational view illustrating the third step for folding first support element, the first frame and front wall in the preferred embodiment of the present invention.
FIG. 3D is an elevational view illustrating the fourth step for folding first support element, the first frame and front wall in the preferred embodiment of the present invention.

Referring to FIGS. 2, 3A, 3B, 3C and 3D, the preferred embodiment of the present invention further includes a first support member 21 in which the front end thereof is pivotally joined to the front wall 13 by means of a pivotal shaft 211 and the rear end thereof is pivotally connected to an end of a connecting rod 22 by means of a pivotal shaft 212. Another end of the connecting rod 22 is pivotally connected to the first frame 11 by means of a pivotal shaft 221 as shown in FIGS. 2 and 3A. The first support member 21, the front wall 13 and the first frame 11 constitute a linking structure. When the front wall 13 is moved to close to the first frame 11, the first support member 21 is actuated to close to the first frame 11 such that the first support member 21 moves between the front wall 13 and the first frame 11. FIGS. 3B, 3C and 3D illustrate steps for folding the first support frame 21 conveniently.

In the preferred embodiment, distance between the upper vertical plate 112 of the first frame 11 and the upper vertical plate 122 of the second frame 12 is longer for being associated with a first type electronic device such as 5.25" disk drive and distance between the lower vertical plate 124 of the second frame 12 and the first support member 21 is shorter for being associated with a second type electronic device such as 3.25" disk drive.

Figures 4A, 4B:
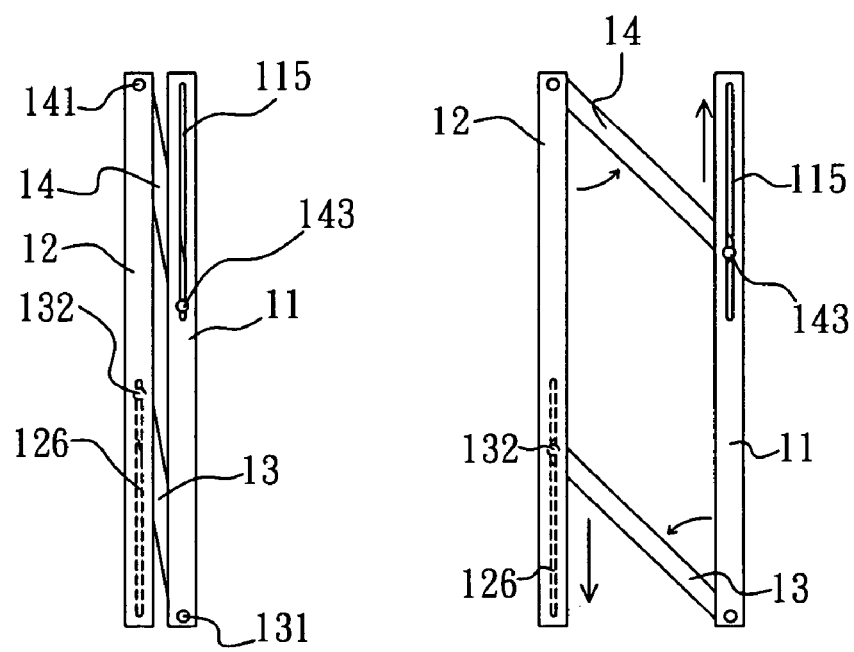
FIG. 4A is an elevational view illustrating the first step for the main structure in the preferred embodiment of the present invention being unfolded.
FIG. 4B is an elevational view illustrating the second step for the main structure in the preferred embodiment of the present invention being unfolded.
Figure 4C:
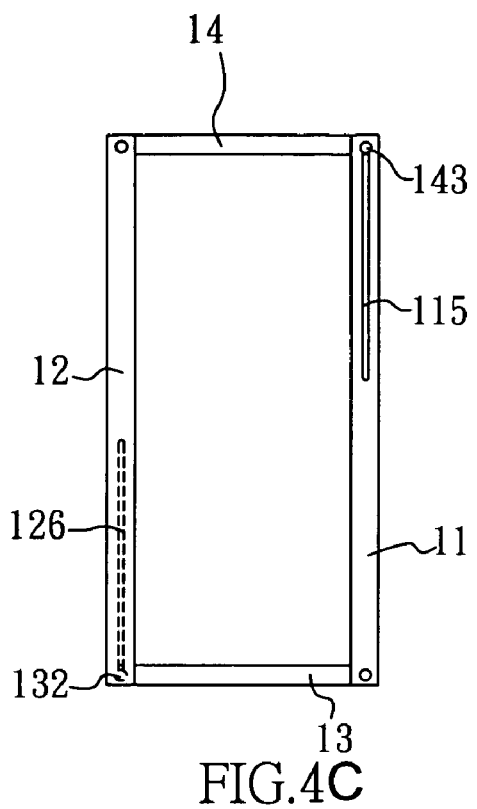
FIG. 4C is an elevational view illustrating the third step for the main structure in the preferred embodiment of the present invention being unfolded.
Figure 5:
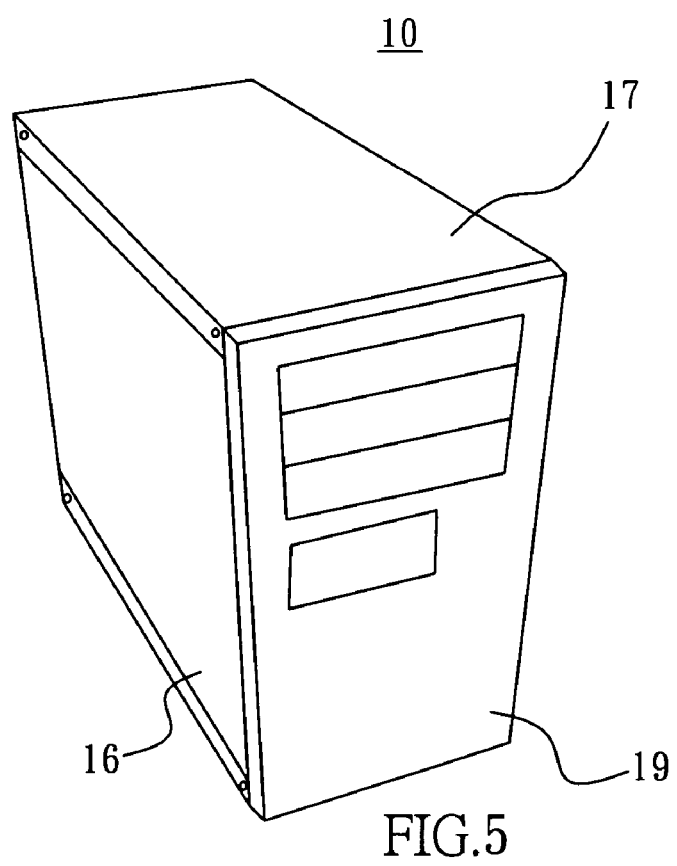
FIG. 5 is a perspective view of the host unit case in the preferred embodiment of the present invention.

Referring to FIGS. 1, 2, 4A, 4B and 4C, when the host unit case 10 is packaged, the left side plate 15, the right side plate 16, the upper cover 17, the lower cover 18 and the front panel 19 are separated from the main structure and the main structure is folded as shown in FIG. 4A and the first frame 11 and the second frame 12 are close to each other for reducing the volume of the host unit case 10 greatly. When the host unit case is set up, the first frame 11 and second frame 12 are moved to two opposite lateral directions to allow the sliding block 132 at the second side of the front wall 13 moves forward along the sliding rail groove 126 of the second frame 12 and the sliding block 143 at the first side of the rear wall 14 moves backward along the sliding rail groove 115 of the first frame 11 as shown in FIGS. 4B to 4C such that the host unit case is fully unfolded. In the mean time, the first support member 21 is in a state of being extended. Then, the separated components are mounted to the main structure to form a complete host unit case 10.

It is appreciated that the foldable host unit case of a computer with sliding rail grooves can be set up easily to promote fun for self-setting up a computer and all components are connected pivotally to each other such that all the components are stacked as small volume at the time of being packaged such that space occupied by the stacked components is reduced tremendously for saving storage.

While the invention has been described with referencing to a preferred embodiment thereof, it is to be understood that modifications or variations may be easily made without departing from the spirit of this invention, which is defined by the appended claims.

What is claimed is:

1. A foldable host unit case of a computer with sliding rail grooves, which is reduced volume thereof effectively while packaging, comprising:

a first frame providing two sliding rail grooves at the rear end thereof;

a second frame being disposed opposite to the first frame and providing another two sliding rail grooves at the front end thereof;

a front wall providing a first lateral end to pivotally connect with the first frame with pivotal shafts and a second lateral end being movably joined to the sliding rail grooves of the second frame with sliding blocks; and a rear wall providing a first lateral end being movably joined to the sliding rail grooves of the first frame with further sliding blocks and a second lateral end pivotally connecting with the second frame with further pivotal shafts;

wherein the first frame has a frame edge bending inward at the upper and lower sides thereof respectively; the front end of the first frame has an upper vertical plate, a horizontal connecting plate and a lower vertical plate; the lower end of the upper vertical plate and the upper end of the lower vertical plate are connected to the inner end and the outer end of the horizontal connecting plate respectively; the sliding rail grooves are disposed at the frame edges respectively;

wherein the second frame has a frame edge bending inward at the upper and lower sides thereof; the front end of the second frame has an upper vertical plate, a horizontal connecting plate and a lower vertical plate; the lower end of the upper vertical plate and the upper end of the lower vertical plate are connected to the outer end and the inner end of the horizontal connecting plate respectively; the sliding rail groove of the second frame are disposed at the lower side of the frame edge of the second frame and at the horizontal connecting plate respectively;

whereby the first frame, the second frame, the front wall and the rear wall are capable of being unfolded to form the host unit case completely and being folded to reduce the volume of host unit case as a packaged size.

2. The foldable host unit case of a computer with sliding rail grooves as defined in claim 1, further comprises a first support member with a front end pivotally connecting with the front wall with a pivotal shaft and a rear end pivotally connecting with an end of a connecting rod with a pivotal shaft; another end of the connecting rod pivotally connects with the first frame with a pivotal shaft for a first type electronic device being disposed between the upper vertical plate of the first frame and the upper vertical plate of the second frame and a second type electronic device being disposed between the lower vertical plate of the second frame and the first support member.

3. The foldable host unit case of a computer with sliding rail grooves as defined in claim 2 further comprises a left side plate joined to the outer side of the first frame.

4. The foldable host unit case of a computer with sliding rail grooves as defined in claim 3 further comprises a right side plate joined to the outer side of the second frame.

5. The foldable host unit case of a computer with sliding rail grooves as defined in claim 4 further comprises an upper cover and a lower cover; the upper cover is joined to the upper sides of the first frame and the second frame respectively; the lower cover is joined to the lower sides of the first frame and the second frame respectively.

6. The foldable host unit case of a computer with sliding rail grooves as defined in claim 5 further comprises a front panel joined to the front ends of the first and second frames respectively.

* * * * *